United States Patent
Call et al.

[15] 3,684,864
[45] Aug. 15, 1972

[54] POINT OF ORIGIN DOCUMENT PROCESSOR

[72] Inventors: Henry M. Call, Costa Mesa; Norman Robert Crain, Huntington Beach; William W. Crain, Santa Ana; Gary L. Pollit, Fountain Valley; Donald E. Rea, Santa Ana, all of Calif.

[73] Assignee: Documentor Sciences Corporation, Santa Ana, Calif.

[22] Filed: Nov. 9, 1970

[21] Appl. No.: 87,708

[52] U.S. Cl...............................235/61.9 A, 271/45
[51] Int. Cl...............................G06k 1/12
[58] Field of Search.........235/61.10, 61.7, 61.11 E, 61.11, 235/61.9 A, 61.9 R; 271/45, 75, 86

[56] References Cited

UNITED STATES PATENTS 3,458,688 7/1969 Garry et al...........235/61.7 R

*Primary Examiner*—Maynard R. Wilbur
*Assistant Examiner*—William W. Cochran
*Attorney*—Spensley, Horn & Lubitz

[57] ABSTRACT

An apparatus for processing documents at the point of original preparation. A document prepared by the application of mark sense data is transported through the document processor, the mark sense data being detected to thereby extract the intelligence therefrom. Transport means adapted to minimize transverse movement of the document within tee processor transports the document from a mark sense reader to a print assembly. Data extracted from the document is processed by a data processing system, and if printing is required, the document is printed upon pursuant to the cooperative relationship between the data processing system and the print assembly.

11 Claims, 12 Drawing Figures

INVENTORS
DONALD E. REA
HENRY M. CALL
WILLIAM W. CRAIN
N. ROBERT CRAIN
GARY L. POLLIT

BY

Spensley, Horn, & Lubitz
ATTORNEYS

INVENTORS
DONALD E. REA
HENRY M. CALL
WILLIAM W. CRAIN
N. ROBERT CRAIN
GARY L. POLLIT

BY Spensley, Horn & Lubitz
ATTORNEYS

INVENTORS
DONALD E. REA
HENRY M. CALL
WILLIAM W. CRAIN
N. ROBERT CRAIN
GARY L. POLLIT

BY Spensley, Horn, Jubas & Lubitz
ATTORNEYS

INVENTORS
DONALD E. REA
HENRY M. CALL
WILLIAM W. CRAIN
N. ROBERT CRAIN
GARY L. POLLIT
BY
ATTORNEYS

INVENTORS
DONALD E. REA
HENRY M. CALL
WILLIAM W. CRAIN
N. ROBERT CRAIN
GARY L. POLLIT

BY Spensley, Horn & Lubitz
ATTORNEYS

POINT OF ORIGIN DOCUMENT PROCESSOR

BACKGROUND OF THE INVENTION

1. Field of the Invention

The present invention point of origin document processor is generally related to the field of data processing systems, and more specifically to those systems which process data in real-time.

2. Prior Art

As modern technology expands into segments of the economy which have heretofore utilized only manual techniques, it becomes increasingly evident that more sophisticated equipment can be advantageously utilized to improve the efficiency of such businesses. Business operations which have heretofore been limited to substantially manual labor are exemplified by those businesses which require real-time inventory control and correlation of disbursements, income and present levels of inventory. The need for a device which would permit prompt processing of the documents immediately following their preparation has long existed. A typical industry which exhibits these needs is the fast-food industry.

One of the devices which is disclosed by the prior art which will permit processing of a document, is the present generation of small digital computers provided with conventional input-output equipment which provides real-time access to the digital computer. A digital computer which is used in this manner can be highly inefficient. A digital computer is a device which will permit processing of input or stored data pursuant to a sequence of programmed instructions. The inherent ability of a digital computer lies in its capability to process stored data at rates which are typically a million arithmetic or logical operations per second. When used in an environment where data is to be input in real-time, the conventional digital computer will either operate in a highly inefficient manner or it will necessitate the provision for background processing unless the particular problems of the application are met by the input-output equipment utilized. In the case of background processing, the applications are generally related to more sophisticated tasks. If operating under conventional techniques, the cost to the user will generally be prohibitive.

As stated hereinabove, the general problem which is being attacked is exemplified by the requirements of food dispensing enterprises. Where a business dispenses prepared foods, the data required to maintain efficient operation will typically comprise the quantity of food dispensed, the level of inventory maintained and the income received by the business. The prior art discloses no devices which can accurately maintain all of this data and provide means to correlate same. The processing devices which are disclosed by the prior art require the data be entered on prepared forms which thereby necessitates the inclusion of data preparation operations. The present invention point of origin document processor substantially solves those problems left unresolved by the prior art. A data control device or document having disposed thereon pertinent data can be processed at the point where the document has been prepared. An operator can manually supply the pertinent information by disposing same on the document in a predetermined manner. The data supplied upon the document is such that the operator can interpret same for the purposes of tabulating an order or an inventory count, the predetermined manner of disposing the data on the data control device permitting processing by the present invention point of origin document processor.

As set forth hereinabove, one of the problems inherent in those devices disclosed by the prior art is the need to acquire the intelligence disposed on a document approximately at the time of its preparation, the processor to perform predetermined operations upon the document and thereafter supply output data in a manner which can be utilized by the operator, customer or business management. The present invention point of origin document processor permits input of a manually prepared data control device, processing same pursuant to predetermined programmed operations and thereafter output necessary output data all within a time frame which will permit substantially simultaneous use of the output data.

SUMMARY OF THE INVENTION

It is an object of the present invention to provide a data processing system adapted to process manually prepared documents for substantially simultaneous use thereof.

It is another object of the present invention to provide an apparatus adapted to be used at the location where documents are prepared.

It is still another object of the present invention to provide means for inputting manually prepared data, performing predetermined operations thereon and providing necessary output data in real-time.

It is yet another object of the present invention to provide an improved data processing system for use by the food dispensing industry.

The present invention point of origin document processor is used in combination with a data control device or document adapted to be prepared by an untrained operator. The data control device is arranged in a predetermined manner such that the ordering of food, employee time data or inventory control data is entered upon the data control device in a manner which will permit visual understanding by the operator as well as intelligible data for the present invention point of origin document processor. The data control device is similar to that described in the copending application, Ser. No. 7,576 , filed on Feb. 2, 1970, entitled Data Control Device by N. Robert Crain and Donald E. Rea. The document employed by the present invention point of origin document processor has printed indicia thereon which visually defines specific catagories, e.g., food to be sold, pertinent data thereon defining a plurality of laterally separated, parallel data channels as well as timing information to be utilized by the document processor. After preparation by the operator, the document is entered at a mark sense reader. The mark sense reader will extract the data disposed on the data control device, adapting same for input to a self contained data processor. The mark sense reader is similar to that described in a co-pending application, Ser. No. 34,943 filed May 6, 1970 entitled Fiber Optic Reading Apparatus by N. Robert Crain, Donald E. Rea and Gary L. Pollitt.

The data disposed upon the document are read by the mark sense reader as the document is transported through the document processor under control of a document transport apparatus. The document transport apparatus substantially assures that no movement of the data control device transverse to the transport path will occur while same is being transported through the system. The document transport apparatus is similar to that described in co-pending application Ser. No. 7,840 filed Feb. 2, 1970, entitled Paper Handling Apparatus by N. Robert Crain, William W. Crain, Gary L. Pollitt and Donald E. Rea.

The data read from the document is input to an internal data processing system for interpretation pursuant to the program operating therein. Based upon the interpretation of the encoded data, the data processing system will perform such actions as are consistent therewith. Such actions include printing upon the data control device, visually displaying pertinent output data and initiating remote operations.

The novel features which are believed to be characteristic of the invention, both as to its organization and method of operation, together with further objectives and advantages thereof will be better understood from the following description considered in connection with the accompanying drawings in which a presently preferred embodiment of the invention is illustrated by way of example. It is to be expressly understood, however, that the drawing is for the purpose of illustration and description only, and is not intended as a definition of the limits of the invention.

BRIEF DESCRIPTION OF THE DRAWING

FIG. 11 is a circuit diagram of another form of the electrical driving and braking circuit used in the document transport apparatus of FIG. 2.

DESCRIPTION OF THE PRESENTLY PREFERRED EMBODIMENT

Figure 1A:
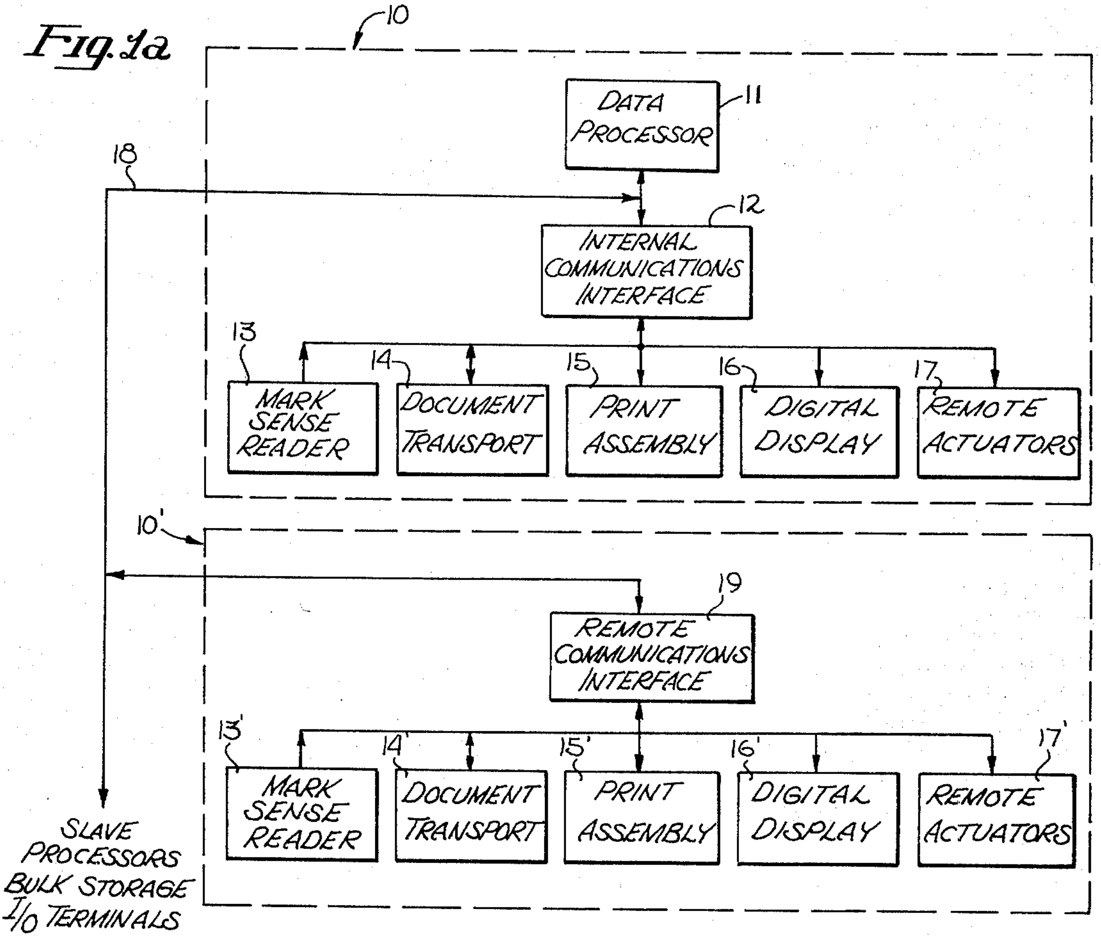
FIGS. 1*a* and 1*b* are schematic diagrams, in block form, of a document processing system in accordance with the present invention.

An understanding of the present invention point of origin document processor can be best gained by reference to FIGS. 1*a* and 1*a* wherein schematic diagrams, in block form, of the present invention are shown therein. Referring first to FIG. 1*a*, a master document processor 10 and slave document processor 10' are connected via communications buss 18. Master document processor 10 comprises a data processor 11 which is connected to internal communications interface 12 and communications buss 18. Internal communications interface 12 transmits data to and receives data from component elements of master document processor 10. The component elements are mark sense reader 13, document transport apparatus 14, print assembly 15, digital display 16 and remote actuators 17, each hereinafter to be described. One or more slave document processors 10' are accessable to data processor 11 via communications buss 18. Slave document processor 10' comprises a remote communications interface 19 to receive from and transmit data upon communications buss 18. Remote communications interface 19 transmits data to and receives data from component elements of slave document processor 10', the component elements comprising the same elements as that contained by a master document processor 10. The functional interface between data processor 11 of master document processor 10 and internal communications interface 12 or remote communications interface 19 is operationally the same, therefore a discussion of the operation of master document processor 10 will be equally applicable to the operation of a slave document processor 10'. The control over a slave document processor 10', bulk storage or remote input-output terminals are provided by the programming system being executed within data processor 11. Although the preferred form of data processor 11 is a suitably programmed, general purpose digital computer, data processor 11 could be implemented by a wired special purpose digital computer. The programming system utilized within data processor 11 can be any suitable programming system adapted for operating with local and remote input and output devices. Data processor 11 is a conventional stored program, general purpose digital computer having typical processing and control capabilities well known to persons skilled in the digital computer art. Data processor 11 typically includes a data input unit, a data output unit, internal storage, an arithmetic unit and a program control unit. For example, data entered at mark sense reader 13 is input at the data input unit; printing assembly 15 is coupled to the data output unit and receives output data for printing.

Figure 1B:
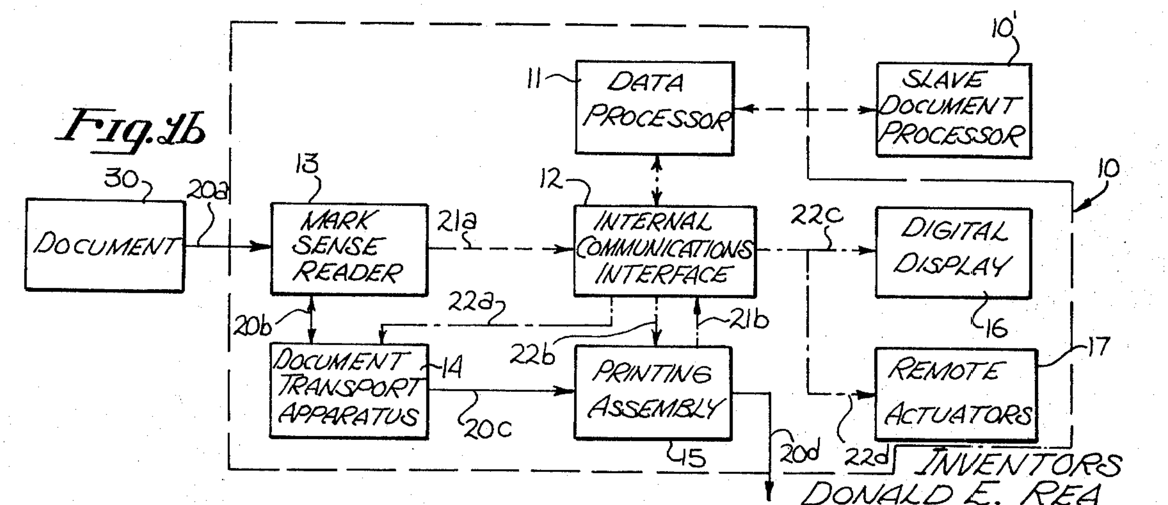

Referring now to FIG. 1*b*, a block diagram illustrating document path 20, data paths 21 and control paths 22 relative to master document processor 10 and the elements thereof are shown therein. Document data and control paths 20, 21 and 22 as shown in FIG. 1*b* are shown segmented into discrete portions, each portion being designated by an alphabetic modifier. Document 30 is provided at the input to master document processor 10 at mark sense reader 13 via document path 10*a*. Data read from document 30 by mark sense reader 13 are transferred to data processor 11 via internal communications interface 12 along data path 21*a*. Document 30 is transported by document transport apparatus 14 along document path 20*b* and 20*c* to printing assembly 15. Printing assembly 15 transfers data relating to the location of document 30 within printing assembly 15 to data processor 11 via internal communications interface 12 along data path 21*b*, said data specifying the presence of document 30 at printing assembly 15 and the location of document 30 subject to a print operation. If the programming system operating within data processor 11 determines that a print operation is required, data processor 11 will transmit control data to printing assembly 15 on control path 22 *b*. Control of document transport apparatus 14 is via control path 22*a*. Based upon the content of data read at mark sense reader 13 from document 30, data processor 11 shall initiate appropriate control instructions to digital display 16 and remote actuators 17 on control paths 22*c* and 22*d* respectively. Digital display 16 can be a conventional visual display, but it is preferably an assembly of alphabetic and numerical vacuum display tubes. Remote actuators 17 are conventional switching devices for initiating remote actions on the command of data processor 11, remote actuators 17 preferably being such devices as electromechanical relays. If remote actuator 17 is a relay, data processor 11 could initiate such remote action as the opening of a cash drawer where the present invention is being utilized in a business where goods are being dispensed and income is being received therefrom. Internal communications interface 12 comprises a conventional digital interface to the input-output components of master document processor 10, internal communications interface 12 comprising conventional digital logic.

Figures 8, 9:
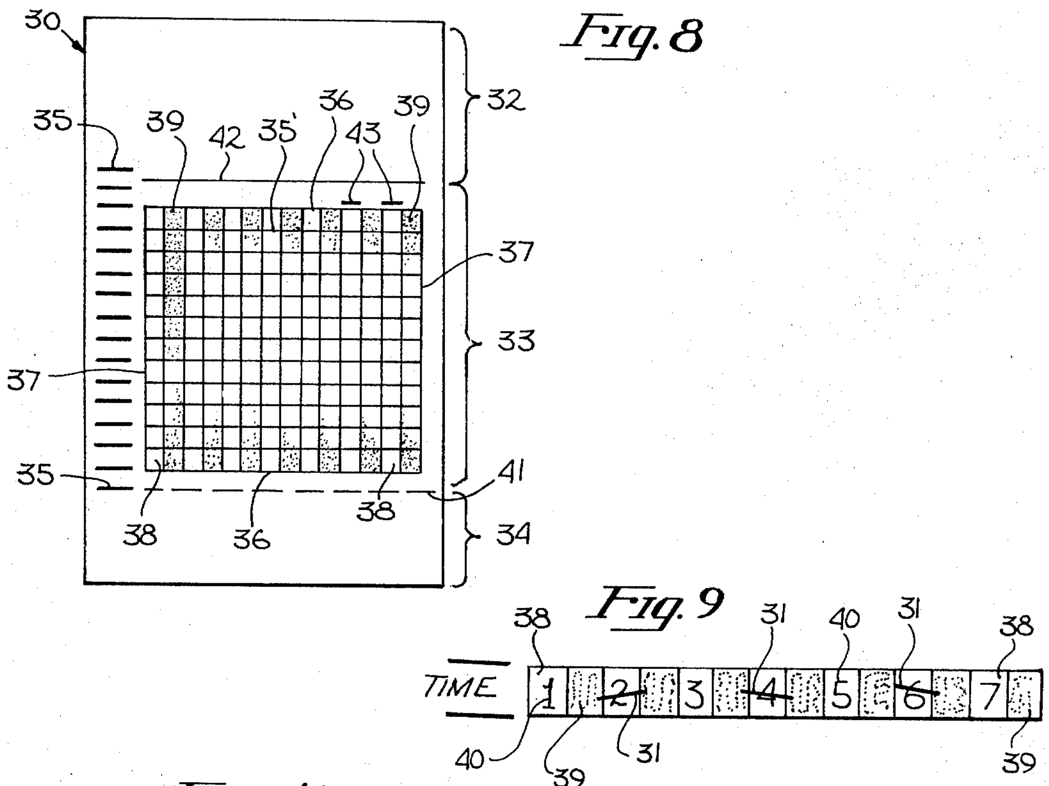
FIG. 8 is a form of a document used by the present invention.
FIG. 9 is an enlarged view of marked data channels relative to the timing track of the document of FIG. 8.

Document 30 being used in combination with master document processor 10 can be best seen by reference to FIGS. 8 and 9. Document 30 is longitudinally segmented into a header-portion 32, data portion 33 and a note portion 34 joined by perforation 41. Document 30 is fabricated of conventional paper stock, the color of which possesses predetermined characteristics which would preclude the absorption of a substantial amount of impinging light. Header portion 32 presents an open area which can be provided with such additions as advertising indicia or provide an appropriate area for printed output to be imprinted by such means as printing assembly 15. Document 30 will be used with the present invention document processor, data disposed therein being read from document 30 as it passes through the present invention in a dynamic state.

Timing marks 35 are uniformly distributed and spaced along the left hand margin of document 30. The timing marks 35 are opaque, light absorbing means and are disposed upon document 30 by such conventional means as printing. When timing marks 35 are read by a section of mark sense reader 13 aligned with timing marks 35, the light absorbing qualities of timing marks 35 will provide means to initiate a synchronizing signal to data processor 11. The data, if any, temporally following each timing mark 35 and its extension 35′ will then be read with the assurance that the positioning is proper, the errors due to timing misregistration having been negated. Data marks 31 as shown in FIG. 9, are disposed upon document 30 within data portion 33. The data portion 33 is defined by the printed horizontal lines 36 and the printed vertical lines 37. A plurality of laterally spaced, parallel data channels 38 are disposed in spaced relation across at least part of the width of the document 30. The parallel data channels 38 are spacially divided by the non-absorbant areas or control stripes 39. The data channels 38 between the non-absorbing control stripes 39 which provide means to define a plurality of longitudinally extending, parallel sources of data. The data read by mark sense reader 13 will be that disposed between any two extension lines 35′.

Referring now to FIG. 9, typical printed indicia 40 data entries are illustrated for a form of document 30. The indicia between timing marks 35 indicates a product which would be sold by the business employing the present invention, the indicia 40 between extensions 35′ and within data channels 38 indicating quantity. The manual disposition of data marks 31 indicates the quantity purchased, the indicia 40 selected providing visual data for the operator, data marks 31 providing data detectible by mark sense reader 13. Data detected by mark sense reader 13 and processed by data processor 11 will yield information needed for output responses.

Referring again to FIG. 8, additional printed indicia for system control and transaction checks are illustrated. In order to insure that all sections of mark sense reader 13 are operable, system check member 42 is provided. System check member 42 is transversely aligned accross data channels 38 following the first timing mark 35. The response of mark sense reader 13 for all data channels 38 is predictable, therefore this will substantially insure proper detection of data if a suitable response is indicated. Transaction marks 43 will distinguish the specific form of document 30 prepared for different purposes, e.g., sales check, inventory control. Where slave document processors 10′ are connected via communications buss 18, each is capable of entering different forms of document 30 since data processor 11 will receive the pertinent data when transaction marks 43 are entered.

Figures 5, 6, 7:
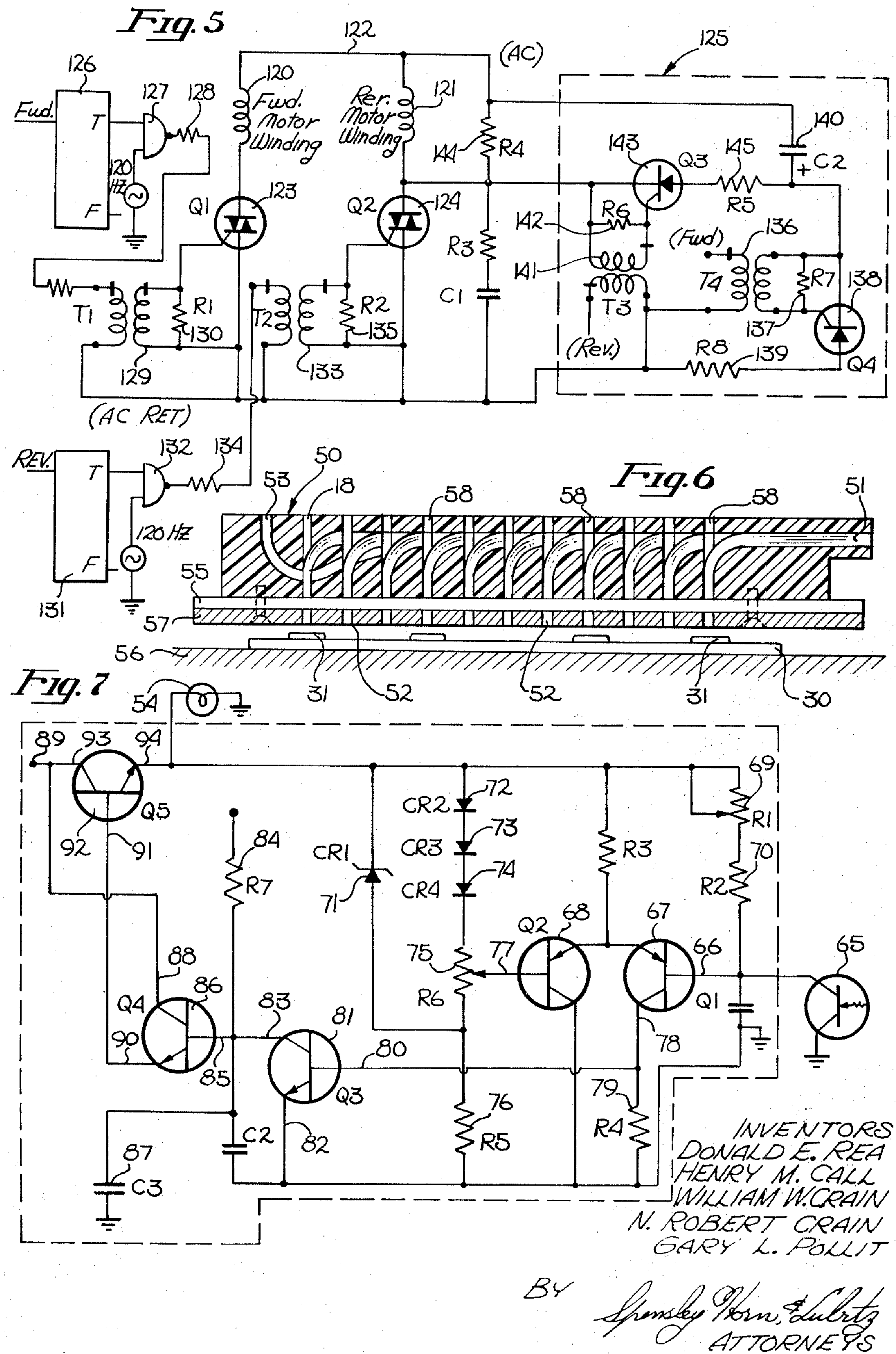
FIG. 5 is a circuit diagram of a preferred form of the electrical driving and braking circuit used in the document transport apparatus of FIG. 2.
FIG. 6 is an enlarged, sectional view of a form of read-head for the mark sense reader of FIG. 2.
FIG. 7 is a circuit diagram of an electrical circuit for controlling the intensity of the light source used in the mark sense reader of FIG. 2.

The manner in which document 30 is entered into the present invention point of origin document processor can be best seen by reference to FIG. 6, wherein a sectional view of a read-head 50 of mark sense reader 13 is illustrated. The sectional view also illustrates a transverse section of document 30 with data marks 31 being disposed under the plurality of detection elements of read-head 50. The preferred form of read-head 50 utilizes conventional fiber optics, the fiber optics read-head 50 shown in FIG. 6 being shown in juxtiposition with a polarized filter 55 and document 30. The means used for detecting mark sense data 31 upon document 30 is the fiber optics system contained within fiber optic read-head 50. The fiber optics comprise a light source node 51 which separates into a plurality of read nodes 52, one read node 52 being provided for each parallel channel 38 disposed upon document 30. In addition, light source node 51 branches out into a single light source control node 53 for detection of the energy levels of an impinging light source 54 which is positioned sub-stantially adjacent light source node 51. Approximately one-half of the fibers comprising read nodes 52 are reflection fibers terminating at a signal node 58. The portion of fiber optic read-head 50 contiguous with read nodes 52 is placed substantially adjacent polarized filter 55. Fiber optic read-head 50 and polarized filter 55 are in vertical spaced relation with document guide 56, the gap between the lower document guide 56 and data mask 57 adapted to receive document 30. The document 30 is disposed within the gap in such a manner that mark sense data 31 disposed upon document 30 will be substantially aligned with read nodes 52.

Light energy derived from light source 54 is transferred to light source 51, the light being transferred to read node 52 and directed toward document 30 pursuant to the conventional light transfer characteristics of the fiber optic system. The light emitted at read node 52 is substantially the same for all channels. Light energy emitted at read nodes 52 passes through polarizing filter 55 and impinges upon a portion of document 30. Those channels of document 30 which have disposed thereon a data mark 31 will substantially absorb the impinging light energy transmitted at read nodes 52, absorption being due to the absorbent qualities of the mark. Those portions of document 30 which do not have disposed thereon data marks 31 will substantially reflect the impinging light energy, the light energy being reflected back to read nodes 52. The fibers making up each read node 52 are approximately one-half light source read node fibers and approximately one-half fibers which are directed to a signal node 58, these fibers being designated as light reflection fibers. The light energy being reflected from document 30 is transferred by the light reflection fibers to signal nodes 58. Those data channels of document 30 which had disposed thereon data marks 31 typically will not reflect a sufficient amount of light energy to indicate the absense of the data mark 31. In the event the means used to dispose data marks 51 upon data control device 50 is such as to leave a reflective surface thereon, polarizing filter 55 will filter out that portion of the reflected energy insuring that data will be properly interpreted. Data read from laterally spaced, parallel data channels 38 of document 30 will be indicated at signal nodes 58, the presence of reflected light energy indicating the absence of a data mark 31, the substantial absence of light energy at signal nodes 58 indicating the presence of data mark 31. Although the read-head 50 used to implement mark sense reader 13 is preferably a fiber optic read-head, read-head 50 could be other conventional reading devices adapted for detecting parallel channels of data.

A novel feature of the present invention is the provision within mark sense reader 13 of an electrical circuit to maintain the light output of light source 54 at a substantially constant level. Referring now to FIG. 7, a suitable electrical circuit for maintaining a substantially constant light source output is shown therein. Referring again to FIG. 6, light source control node 53 emits light energy substantially equal to the light energy input to light source node 51. The intensity of light source 54 will typically degrade with age, and where dirt and dust are present in the environment, therefore the output of light source control node 53 is used to provide information necessary to maintain the output of light source 55 at a substantially constant level. Although the output of light source control node 53 is preferably used to supply feedback data, the direct output of light source 54 could be utilized. Referring now to FIG. 7, photo-transistor 65 monitors the output of light source control node 53, the collector of photo-transistor 65 being connected to the base terminal 66 of transistor 67, the emitter of photo-transistor 65 being terminated at ground potential. Transistors 67 and 68 are interconnected to comprise a conventional differential amplifier. The combination of variable resistor 69, resistor 70 and the internal resistance of photo-transistor 65 to provide the feedback voltage to base 66 of transistor 67. The combination of zener diode 71, diodes 72, 73 and 74, variable resistor 75 and resistor 76 serve to provide the reference bias voltage to base 77 of transistor 68. Collector 78 of transistor 67 is connected to one terminal of resistor 79, the second terminal of resistor 79 being terminated at ground. Collector 78 of transistor 67 is connected to base 80 of transistor 81, emitter 82 being terminated at ground. Collector 83 of transistor 81 is connected to a load resistor 84, base 85 of transistor 86 and stablizing capacitor 87. Collector 88 of transistor 86 is connected to a positive voltage 89, emitter 90 being connected to base 91 of transistor 92. Collector 93 is connected to position voltage source 89, emitter 94 of transistor 92 being connected to light source 54 and to zener diode 71, diode 72, resistor 95 and variable resistor 69 supplying the regulated voltage thereto.

Photo-transistor 65 is a conventional device, the internal resistance of which decreases with an increase in the impinging light energy from light source control node 53. Photo-transistor 65 is placed substantially adjacent light source control node 53 for the purpose of detecting changes in the intensity of light source 54. Since conventional light sources will output degraded levels of light energy as the device ages, the light energy impinging upon photo-transistor 65 will tend to decrease as the device ages. A decrease in light energy impinging upon photo-transistor 65 will result in an increase in the resistance of photo-transistor 65. As the internal resistance of photo-transistor 65 increases, the voltage at base 66 of transistor 67 will tend to go to a more positive level. Disposition of dirt on the optical system or aging of the fiber optic bundle will typically produce a decrease in the content of usable light energy. Since transistors 67 and 68 operate as a differential amplifier, the output of the differential amplifier appearin at collector 78 of transistor 67 will be a function of the difference between the voltage at base 66 of transistor 67 and the reference voltage at abase 77 of transistor 68. In the case where aging of the light source 54 results in an increase of the voltage at base 66 of transistor 67, the voltage appearing at collector 78 of transistor 67 will show a corresponding decrease toward ground. The reduction of voltage transferred to base 80 of transistor 81 will reduce the amount of electrical current being switched by transistor 81 thereby causing a positive increase in the voltage at collector 83 of transistor 81. Since the purpose of the electrical circuit shown in FIG. 7 is to stabilize the output of light source 54, capacitor 87 is connected to the junction of collector 83 and base 85 to dampen any transient changes and thereby stabilize the circuit. The increase in voltage at base 85 of transistor 86 will cause an increase in current from collector 88 through emitter 90 thereby increasing the base current to transistor 92. As the base current to transistor 92 is increased, the voltage at emitter 94 will increase toward that of the positive voltage source 89 connected to collector 93 of transistor 92. The increase in voltage at emitter 94 of transistor 92 will be transmitted to light source 54 thereby tending to increase the intensity of light source 54. It can therefore be seen that a decrease in the light intensity of light source 54 results in a subsequent increase in voltage to light source 54 pursuant to the feedback control circuit thereby increasing the intensity of the light output of light source 54 to its original predetermined level. The negative feedback will result in a substantially constant light output from light source 54 thereby insuring that the process of reacting data from document 30 will not be deleteriously effected by the aging or deterioration of light source 54. The electrical circuit shown in FIG. 7 is a suitable circuit for the stated objective, but the feedback process could be implemented by other suitable electrical circuits.

Typical values for the components shown in FIG. 7 are set forth in Table 1 hereinbelow:

| Component | Value |
|---|---|
| Variable Resistor ($R_8$) | 5K Ohms |
| Resistor ($R_9$) | 100 Ohms |
| Resistor ($R_{10}$) | 270 Ohms |
| Resistor ($R_{11}$) | 5.1K Ohms |
| Resistor ($R_{12}$) | 120 Ohms |
| Variable Resistor ($R_{13}$) | 2K Ohms |
| Resistor ($R_{14}$) | 1K Ohms |
| Capacitor ($C_2$) | 0.1 $\mu$ f |
| Capacitor ($C_3$) | 22 $\mu$ f |
| Capacitor ($C_8$) | 8,000 $\mu$ f |
| Transistors ($Q_3$, $Q_4$) | 2N2905 |
| Transistor ($Q_5$) | 2N4921 |
| Transistors ($Q_6$, $Q_7$) | 2N3055 |
| Zener Diode (CR1) | 1N4731 |
| Diode (CR2,3,4) | 1N4001 |

TABLE I

Figures 2, 3, 4:
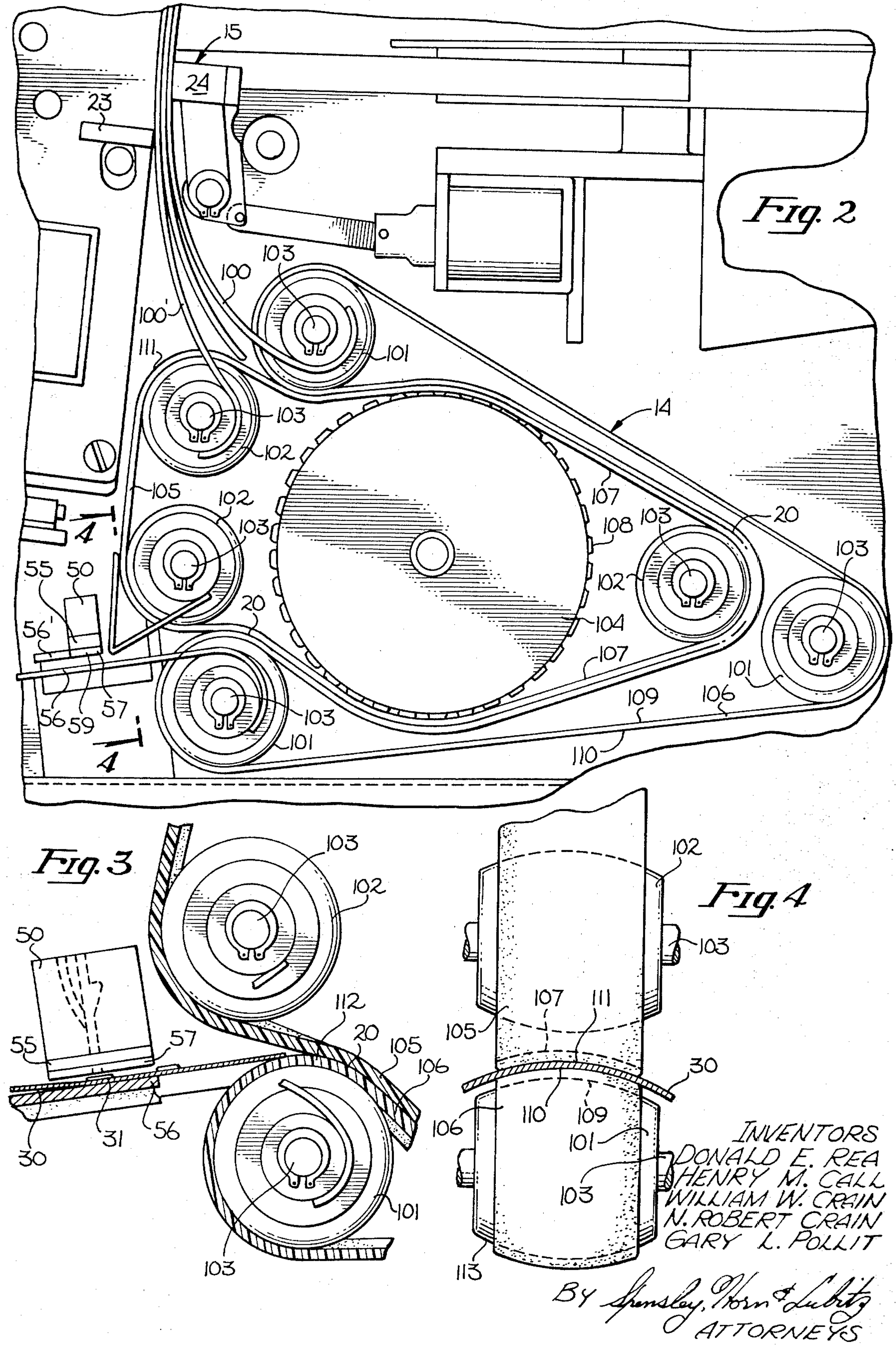
FIG. 2 is an elevation view of a form of document transport apparatus which may be employed in the present invention structure shown schematically in FIGS. 1*a* and 1*b*.
FIG. 3 is an enlarged elevation view of the input portion of the document transport apparatus of FIG. 2.
FIG. 4 is an enlarged view of the roller-belt assembly shown in FIG. 2 taken along line 4—4 with a document inserted in said assembly.

In order to read mark sense data 31 from document 30, document 30 must be accorded sufficient motive power to pass under fiber optic read-head 50. This mode of power is supplied by the entrance of document 30 into document transport apparatus 14. Referring now to FIG. 2, an elevation view of an embodiment of document transport apparatus 14 is shown therein. FIG. 2 illustrates the relationship between document transport apparatus 14 and fiber optic read-head 50 and print assembly 15. Fiber optic read-head 50 is located at the input portion to each document transport apparatus 14. The lower and upper document guides 56 and 56' set the limits of the lower and upper movement of document 30 thereby guiding document 30 to the input station of document transport apparatus 14. Aperture 59 of data mask 57 provides visual access to document 30 for the read nodes 52 of fiber optic read-head 50.

Document transport apparatus 14 provides document path 20 for document 30 extending substantially from fiber optic read-head 50 to the area formed by paper guides 100 and 100' substantially adjacent printing assembly 15. Document transport path 20 is defined by the area provided by the interface of the two belt structures to be described in detail hereinbelow.

Document transport apparatus 14 comprises two groups of rollers 101 and 102, each revolving on a stationary shaft 103. The preferable profile of the roller will be a conventional convex crown, but it could have any profile which will insure proper movement of the belt accross the periphery of rollers 101 and 102. The driving force of document transport apparatus 14 is derived from drive wheel 104. Drive wheel 104 is cooperatively coupled in a known manner to a forward motor and a reverse motor via a conventional shaft secured to drive wheel 104. The manner of coupling a forward motor and a reverse motor to a drive wheel is well known, the specific manner in making such coupling not being part of the present invention. The forward and reverse motors are conventional devices, and are preferably electrically powered motors. The group of crowned rollers 102 are in cooperative engagement with the endless belt 105 and the group of crowned rollers 101 are in cooperative engagement with the endless belt 106. The endless belts 105 and 106 are each fabricated of known material, e.g., rubber, capable of forming a substantially frictional interface when placed against one another.

The crowned rollers 101 and 102 are oriented so as to form a document transport path 20 for the document 30 from fiber optic read-head 50 to the printing assembly 15. When belt 105 is mounted on crowned rollers 102 the inside surface 107 of belt 105 will contact the surface of rollers 102 as well as the peripheral surface of driving wheel 104. The configuration of the belt 105 formed by rollers 102 may be generally referred to as a male belt configuration. The peripheral surface 108 of the drive wheel is preferably a surface which can frictionally engage the rubber belt 105 but the surface 108 could utilize other conventional contact means. When belt 105 is mounted upon rollers 101, the inside surface 109 of the belt 106 will contact only the rollers 101. The outside surface 110 of the belt 106 engages the outside surface 111 of the belt 105 forming the document transport path 20 for document 30. The configuration of the belt 106 around the rollers 101 may be generally referred to as a female belt configuration. The female belt configuration intimately receives and contacts the male belt configuration over a substantial portion of the surface of the male belt 105.

In operation, when the drive wheel is rotating in a counter-clockwise direction, the engagement of the outer surfaces 111 and 110 of the belts 105 and 106 respectively will move the document 30 from the area of fiber optic readhead 50 to the flanges of the document guides 100 and 100'. The entire length of the document transport path 20 is enclosed between the frictionally interface surfaces 111 and 110 of the belts 105 and 106 respectively without any portion thereof permitting substantial longitudinal or lateral slipage of document 30. Therefore, the orientation of the rollers 101 and 102 and corresponding belts 106 and 105 preclude the need for sprockets to transport the document 30 through the document transport apparatus 14. When the drive wheel 104 is driven in a clockwise direction, document 30 can be transported back to the fiber optic read-head 50 when such is required due to a rejection of the document 30. A document 30 can be rejected for reasons such as improper transaction marks, defaced surface or other faults which would preclude processing by data processor 11.

The manner in which the document 30 is inserted into the document transport apparatus 14 can be best seen from FIG. 3. Document 30 is inserted between the lower and upper document guides 56 and 56'. Fiber optic read-head 50 detects the leading edge of document 30 initiating activation of document transport apparatus 14. A forward motor will rotate drive wheel 104 in a counter-clockwise direction. The leading edge of document 30 is engaged by the primary interface 112 of the converging belts 105 and 106 and is thereby drawn into document transport apparatus 14 by the frictional engagement of the belts 105 and 106. As an alternative embodiment of the present invention, several slave document processor 10' can be connected to the master document processor 10 in a mode whereby the document 30 in each processor is processed in a sequential manner by data processor 11 in the master document processor 10. When slave document processors 10' are employed, the leading edge of document 30 will be adapted to initiate a signal to data processor 11 to start the forward motor in the particular slave document processor 10, but initiation will be delayed by data processor 11 consistent with the programming system employed. In this manner, document transport apparatus 14 of each of the document processors 10 and 10' will be enabled by the respective mark sense reader 13, but motion of the document 30 at the respective primary interface 112 will be delayed until the time requirements of data processor 11 have been met.

The manner in which document 30 can be transported through document transport apparatus 14 without the need for sprockets can be best seen by reference to FIG. 4. FIG. 4 illustrates a front view of the crowned rollers 101 and 102 and the input into the document transport apparatus 14. FIG. 4 also illustrates document 30 engaged by the outside surfaces 110 and 111 of the belts 106 and 105 and being transported into document transport path 20. The crowned rollers 101 and 102 are adapted to provide means whereby belts 106 and 105 will move over the crowned rollers 101 and 102 without any substantial laterial shifts of the belts 106 and 105. The crown or curvature 113 of the rollers 101 and 102 provide the necessary adaptation to prevent lateral slippage of belts 105 and 106. The profile of rollers 101 and 102 is preferably a convex crown as shown in FIG. 4, but it can be any profile which will prevent lateral slippage of the belts 105 and 106. The rollers 101 and 102 can be made of conventional materials, the specific materials used to fabricate rollers 101 and 102 not being part of the present invention.

The belts 105 and 106 as shown in FIG. 4 are being moved to provide forward movement for document 30 along the document transport path 20. As a point on the belt 105 proceeds over the roller 102, outside surface 111 of belt 105 will frictionally engage outside surface 110 on belt 106. When document 30 is inserted, belt 106 and document 30 will conform to the curvature 113 of crown roller 101. Document 30 will be firmly secured between outside surfaces 110 and 111 of belts 106 and 105 by the frictional engagement thereof. Referring again to FIG. 2, the non-slipping frictional contact of belts 105 and 106 is substantially maintained from the primary interface 112 shown in FIG. 3 to the input to document guides 100 and 100', the distance of contact substantially corresponding to document transport path 20.

Electronic braking of the forward motion of drive wheel 104 permits accurate positioning of document 30 at printing assembly 15. A suitable electrical circuit to provide the electronic braking is shown in FIG. 5. The objective of the electrical circuit shown in FIG. 5 is to initiate operation of the reverse motor upon the occurrence of the signal to stop document 30, and thereby quickly stop the forward motion of the document 30. The electrical circuit shown in FIG. 5 is a suitable circuit to provide effective braking means.

The provision for rapid halting means permits accurate positioning of document 30 when same is to be subjected to a print operation at printing assembly 15. Printing assembly 15 comprises an optical detector 23 and printing means 24. Optical detector 23 detects the presence of document 30 and position data afforded by timing mark 37 and can be a conventional optical reading apparatus adapted to provide digital data. Printing means 24 can be a conventional printing device adapted to be digitally actuated and is preferably an impact printer. When optical detector 23 detects the leading edge of document 30 or the presence of timing marks 35, data transferred to data processor 11 will indicate what, if anything, is to be printed on document 30. In addition, a printing requirement will initiate the operation of electronic braking circuit 125, electronic braking circuit 125 being part of the total motor control circuit shown in FIG. 5.

The forward and reverse motor are cooperatively coupled to drive wheel 104, each for providing rotational force to drive wheel 104 at the proper time. Referring now to FIG. 5, forward motor winding 120 and reverse motor winding 121 are electrically connected to one side of an alternating current line 122. The second electrical connection to motor winding 120 and 121 are driven by bidirectional triode thyristors 123 and 124 respectively, the thyristors 123 and 124 hereinafter referred to by the conventional terms used in the art, i.e., triac. In addition, reverse motor winding 121 is driven by the electronic braking circuit generally designated by the reference numeral 125. When mark sense reader 13 indicates that document 30 is to be moved in a forward direction, flip-flop 126 will initiate operation of the forward motor, the forward motor applying the proper rotational motion to drive wheel 104. It would be obvious to one skilled in the art that flip-flop 126 could be replaced with other conventional binary mode devices. The "true" output of flip-flop 126 supplies an enabling signal to gate 127, the designation "true" being used in the conventional manner employed for binary logic. Through limiting resistor 128, an alternating 120Hz signal is supplied to isolation transformer 129 with the output of the secondary winding thereof being applied across load resistor 130 and triac 123. Since triac 123 will turn off each time its input signal passes through a zero crossing, the gating signal enables triggering of the triac 123 each half cycle and therefore maintains an A.C. signal accross forward motor winding 120.

When document 30 is rejected for any reason, such rejection will require a motor reversal to return document 30 to the area below mark sense reader 13. Flip-flop 131 will initiate the operation of the reverse motor via triac 124. Energizing reverse motor winding will initiate rotational motion of the reverse motor, the rotational motion being transferred to drive wheel 104 in a conventioanl manner rotating same in a clockwise direction. As in the case with the operation of the forward motor, gate 132 will supply an alternating 120Hz. signal to isolation transformer 133 through limiting resistor 134. The input signal appearing on the secondary winding of transformer 133 is applied accross load resistor 135 and triac 124. Triac 124 will apply the A.C. signal across reverse motor winding 121. Setting flip-flop 131 to the "true" state also resets flip-flop 126 thereby deactivating forward motor winding 120 when reverse motor winding 121 is activated.

The ability to stop the movement of document 30 and thereby position same for printing purposes is provided by electronic braking circuit 125. When optical read station 23 of printing assembly 15 detects the presence of position reference marks on document 30, data processor 11 will turn flip-flop 126 off, turn a braking signal on thereby initiating application of a braking voltage to reverse motor winding 121 an event which will result in faster stopping than would occur by the mere triggering of triac 124 after the stopping of the forward motor. The rapid stop time is obtained by superimposing the action of the initiated reverse motor upon the de-energized forward motor. In operation, while the forward motor is operating, a forward gating signal is applied to the isolation transformer 136, the secondary winding of transformer 136 applying an alternating current signal across load resistor 137 and the gate-cathode combination of silicon controlled rectifier (SCR) 138. SCR 138 will conduct electrical current, limited only by the resistor 139. The conduction of current through SCR 138 will charge capacitor 140 to approximately the peak A.C. line voltage, the charging of capacitor 140 being limited only by the internal resistance of SCR 138 and resistor 139. When the reverse motor winding 121 is to be energized for the purpose of providing rapid stopping of document transport apparatus 14, an alternating current signal derived from the output of flip-flop 131, or any other proper logical breaking indicator, is supplied to isolation transformer 141, the output signal of the secondary winding of transformer 141 being applied across load resistor 142 and the gate-cathode combination of SCR 143. At the time the braking indicator is turned on, the forward motor is still providing forward rotational movement to drive wheel 104. The initiation of the reverse signal is to energize reverse motor winding 121 and thereby superimpose the reverse rotation of the reverse motor upon the decaying forward rotation of the forward motor. The firing of SCR 143 will provide a current conducting path through SCR 143 thereby applying the voltage stored in the capacitor 140 across reverse motor winding 121 and the load resistor 144 discharging capacitor 140 through resistors 144 and 145. Applying peak line voltage stored in capacitor 140 across reverse motor winding 121 will initiate rapid activation of the reverse motor thereby rapidly retarding the forward motion of the forward motor ultimately halting the rotation of drive wheel 104. The charge stored in capacitor 140 produces a voltage which is greater than the output of triac 124. The braking voltage derived from capacitor 140 will typically exceed the power rating of reverse motor winding 121, but since it is applied for only a short interval of time which is dependent upon the time constant of electronic braking circuit 125, no damage will result to reverse motor winding 121. The operation of electronic braking circuit 125 will typically stop a document 30 moving at a speed of 10 inches per second in approximately 50 milliseconds.

Representative values for the components of the electrical circuit illustrated in FIG. 5 are set forth in Table 2 hereinbelow:

| Component | Value |
|---|---|
| R1, R2, R5, R6, R7 | 100 ohms |
| R3, R8 | 4.3 ohms |
| R4 | 6,200 ohms |
| C1 | 0.068 microfarads |
| C2 | 100 microfarads |
| Q1 | MAC3–4 |
| Q2 | MAC3–6 |
| Q3, Q4 | 2N4443 |

An alternative form of an electrical circuit suitable for driving document transport apparatus 14 and providing electronic braking is illustrated in FIG. 11. Since the braking portion of the circuit is in a form different from that shown in FIG. 5, it shall be described in detail herein. During forward motor operation, capacitor 180 and capacitor 181 comprise a voltage doubler acting in combination with diode 182 and SCR 183. For alternative half cycles of the alternating current input signal, diode 182 will be forward biased into conduction, thereby resulting in SCR 183 being gated on. While diode 182 is conducting, capacitor 180 accepts a charge approximately equal to the peak AC line voltage, namely 170 volts. While SCR 183 is gated on and conducting, capacitor 181 receives a charge approximately equal to double the peak AC line voltage. The longer the forward motor is activated, the approximation of the voltage doubler will become closer. Resistor 184 acts to limit current surges during the charging times of capacitors 180 and 181.

When the forward motor is stopped, SCR 185 is gated on which will cause capacitor 181 to discharge through reverse motor brake winding 186. Reverse motor brake winding 186 consists of all but a small number of turns of the reverse motor winding 187. Resistor 188 provides a slow discharge time for capacitor 181 and a voltage source for the brake control portion of the circuit comprising field effect transistor (FET) 189 and SCR 190 and associated components.

The voltage across resistor 188 will increase rapidly from zero to a voltage which is in the range of 175 to 250 volts, the voltage being dependent upon the charge on capacitor 181. The decay time is substantially longer than the rise time. During the decay time, the voltage across capacitor 191 will increase to a voltage which is set by Zener diode 192, the voltage typically being 8.2 volts. The voltage across FET 189 is limited by Zener diode 193, the voltage typically being approximately 15 volts. The voltage across capacitor 194 will slowly go positive at the terminal connected to SCR 190.

When the voltage across resistor 188 has decayed sufficiently to allow the voltage across FET 189 to fall below 10 volts, FET 189 will be turned on thereby gating on SCR 190. SCR 190 in combination with the charge built up in capacitor 194 will reverse bias SCR 185 turning SCR 185 off. As the charge in capacitor 194 is built up in a polarity opposite to that described above, i.e., negative at the terminal connected to SCR 190, SCR 190 will be reverse biased and turned off.

Representative values for the components of the electrical circuit illustrated in FIG. 11 are set forth in Table 3 hereinbelow:

| COMPONENT | VALUE |
|---|---|
| R1 | 5 ohms |
| R2 | 50 ohms |
| R3, R4, R5, R6, R10, R11 | 100 ohms |
| R7 | 4.3 ohms |
| R8 | 200K ohms |
| R9 | 2,500 ohms |
| R12 | 43K ohms |
| R13 | 4,700 ohms |
| Q1 | MAC3–4 |
| Q2, Q3, Q4, Q6 | 2N4190 |
| Q5 | 2N2647 |
| C1 | 100 microfarads |
| C2 | 0.068 microfarads |
| C3 | 220 microfarads |
| C4 | 0.047 microfarads |
| C5 | 1.0 microfarads |
| C6 | 0.1 microfarads |
| CR1, CR4–7 | 1N4723 |
| CR2 | 1N746A |
| CR3 | 1N 965B |

Although electronic braking circuit 125 is a preferred means to enable accurate positioning of document 30, a conventional stopping motor or an electromagnetic circuit could be effectively utilized.

The disposition of data marks 31 upon document 30 making same amenable for detection, can be best seen by reference to FIG. 9 wherein an enlarged longitudinal section of document 30 is shown. The unshaded portions represent the portions of the parallel data channel 38, shaded control stripes 39 comprising the channel separation areas. The absence of any data mark 31 in a data channel 38 will result in reflection of a substantial amount of the incident light energy from the respective read node 52 of fiber optic read-head 50 thereby giving the proper logical indication to the data processor 11. The presence of a data mark 31 in a data channel 38 represents a light absorbing member which will preclude the reflection of an amount of incident light sufficient to produce a logical indication opposed to that set forth above. A combination of several encoded data marks 31 may be utilized by a specific system and transaction. A manner of encoding the data marks 31 may be by conventional known techniques and is not a part of the present invention. The timing marks 35 and extensions 35′ define a sampling segment of the parallel data channels 38. When data transferred from mark sense reader 13 to data processor 11 indicates that a timing mark 35 has been reached, the amplified, parallel output of mark sense reader 13 will be sampled at a predetermined time following the respective timing mark 35, the sampling period being dependent upon the speed at which document transport apparatus 14 moves document 30. The output of mark sense reader 13 is adapted to be input to data processor 11. The output of fiber optic read-head 50 will be sensed by conventional devices such as photodiodes or phototransistors, the presence or absence of light energy being converted by conventional read amplifier circuits.

The input to data processor 11 from mark sense reader 13 will be data representing timing marks 35, system check line 42, transaction data 43 and data marks 31 disposed in data channels 38. The interpretation of the data output from mark sense reader 13 will be contingent upon the programming system operating within data processor 11. Data processor 11 comprises a conventional digital computer having six active registers, a serial arithmetic unit, parallel programmed word input/output and a magnetic core memory system. Data processor 11 has an instruction set which has nine memory reference instruction and 48 generic instructions. The memory reference instructions are typically represented by such instruction as add, subtract and store. The generic instructions generally comprise logical operations upon data and control functions. The exchange of information between data processor 11 and the internal and external communications interface 12 and 19 respectively is by means of a direct input/output channel in which word input/output transfers are accomplished under direct program control. Other than the core memory system, data processor 11 comprises elements of a conventional digital computer and therefore the specific implementation thereof are not a part of the present invention. Although the preferred form of data processor 11 is a stored program, general purpose digital computer, data processor 11 could be a wired program special purpose digital computer.

Figure 10:
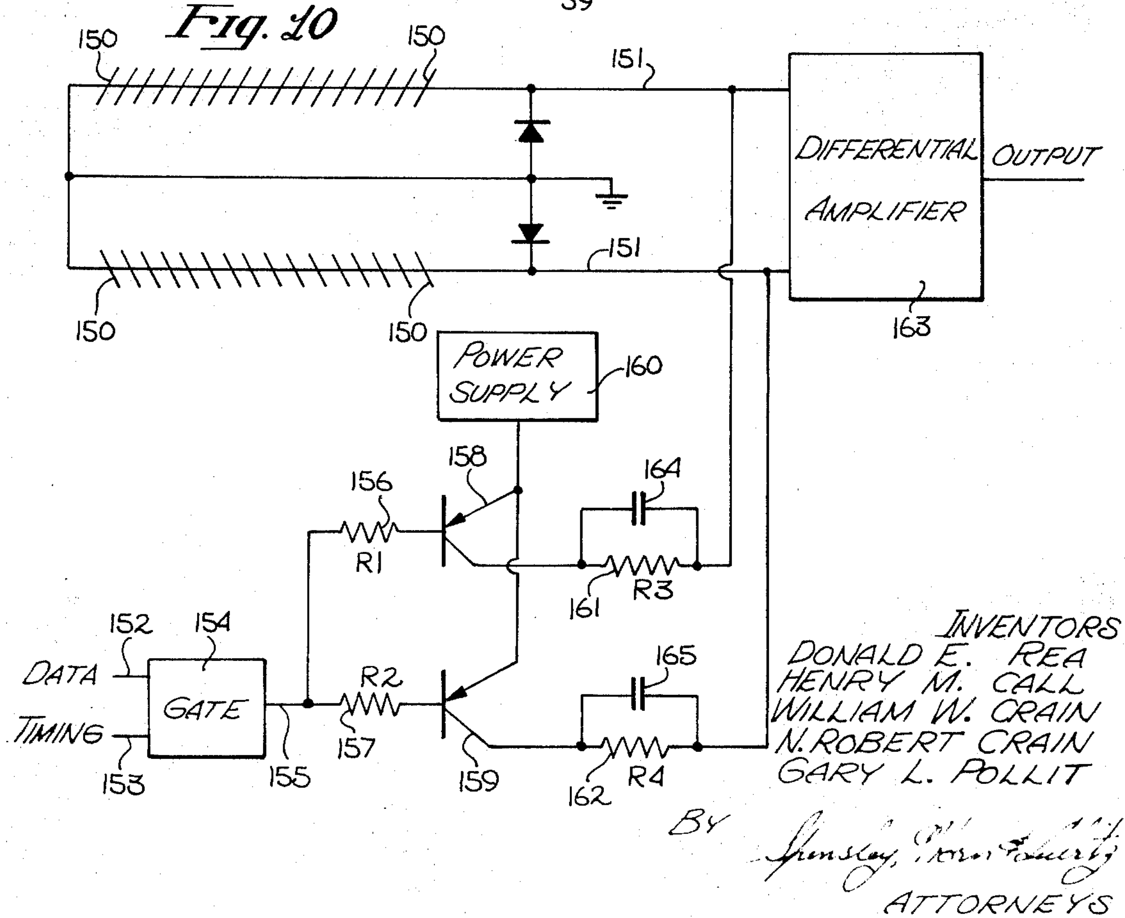
FIG. 10 is a circuit diagram of a form of a temperature compensation circuit for the magnetic core memory of the data processor of FIG. 1.
Figure 4:
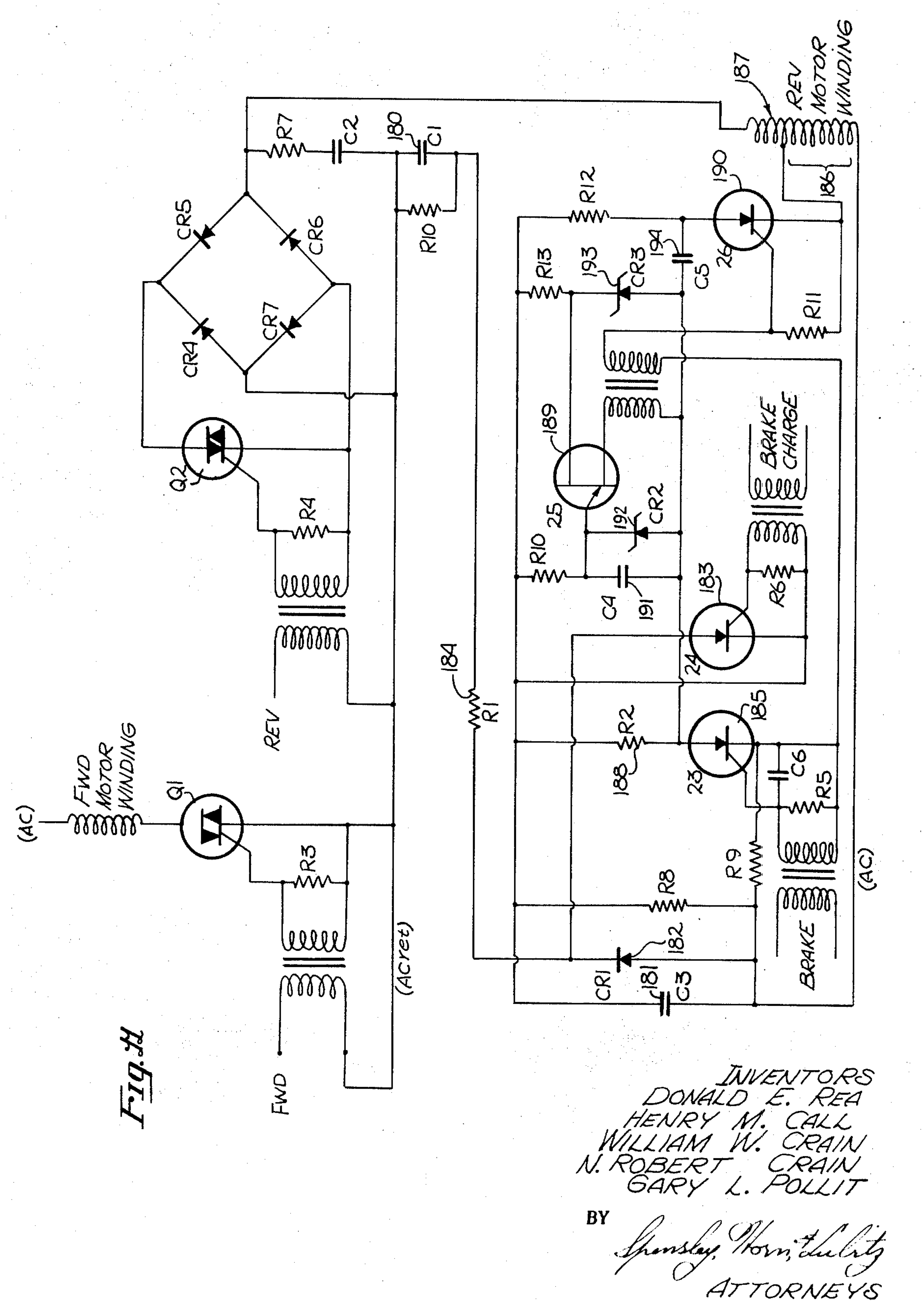

The core memory system used by data processor 11 is designed so that up to four memory modules may be paralleled to increase the capacity from 4,096 four-bit words to 16,380 four-bit words. The expansion of the core memory used by data processor 11 is made by plugging in additional memory modules. An embodiment of the core memory system utilized by data processor 11 is provided with a temperature compensation circuit similar to that disclosed in co-pending application Ser. No. 11,235 filed Feb. 13, 1970. A suitable electrical circuit for providing temperature compensation to the core memory utilized by data processor 11 is illustrated in FIG. 10 wherein a typical inhibit/sense circuit is shown. The need for the temperature compensation circuit shown in FIG. 10 arises out of the changes in the magnetic characteristics of magnetic cores when the cores are subjected to changes in temperature. In the typical operation of a magnetic core memory array, a number of magnetic cores are selected for reading or writing, the number selected usually being identified as a data word, byte or other conventional organization. The data word is selected by the initiation of a one-half current pulse on each of two lines. The magnetic cores 150 have a characteristic hystersis loop which makes them amenable to perform a binary storage function. Upon coincidence of two half-current pulses, magnetic cores 150 can be made to change the direction of magnetic flux and therefore change the stored data. The magnetic cores 150 store a "1" or "0" in accordance with the direction of the magnetic flux. To sense the status of a core 150, it is necessary to send a current through the coincident winding and thereby apply a magnetomotive force which will reset the core to one state or the other. In this case, the inhibit/sense line 151 and 151′ is used to sense the status of the magnetic cores 150. If the core initially contains a "1", the change in flux in the core will create an induced voltage, but if the core initially contained a zero, there will be no change in flux and therefore no induced voltage.

A data input 152 and timing input 153 provide the input data necessary to provide the adequate timing signals to initiate the logical action of gate 154. Upon the coincidence of a timing pulse and data pulse of the proper logical state an inhibit pulse will appear on line 155. Biasing resistors 156 and 157 set the input levels for transistors 158 and 159 respectively thereby triggering the inhibit pulse. Power supply 160 provides the driving force for the inhibit circuit. When an inhibit pulse is initiated, a current pulse will appear on lines 151 and 151', the current being limited only by the limiting resistors 161 and 162 and the resistance present in the conducting lines 151 and 151'. Limiting resistors 161 and 162 are shunted by speed-up capacitors 164 and 165 respectively. Differential amplifier 163 is used to sense the effects of the change of magnetic flux in the cores 150 and can be similar to that which would be used with a continuous sense winding in a four-wire memory design, the specific type of differential amplifier being used, not being part of the present invention.

The inhibit circuit controls the inhibit current appearing on lines 151 and 151' and therefore compensates for any change in the characteristics of magnetic cores 150 which would occur due to a change in the ambient temperature. When there is an increase in the ambient temperature, the magnetic characteristics of magnetic cores 150 will be altered. The particular characteristic which is relevant herein concerns the amount of coincident current which is required to change the direction of magnetic flux. The inhibit current limiting resistors 161 and 162 are in series with a resistance which is equal to one-half of the resistance of the inhibit/sense winding 151 and 151'. The resistance of the inhibit/sense lines 151 and 151' arise from the non-ideal electrical characteristics of the line. The inhibit/sense lines 151 and 151' are conductive members adapted to be integrated into a memory core system and is typically fabricated of copper, therefore, resistance of the line will increase approximately 0.4 percent per degree centigrade rise in the ambient temperature. The desired temperature coefficient of the inhibit current is approximately 1.3 milliamperes per degree Centigrade. A selected series combination for the inhibit resistors 161 and 162 and the line resistance $R_s$ will provide the desired temperature coefficient. When the ambient temperature rises, those devices disclosed by the prior art would necessitate reducing the output of the power supply 160 to thereby reduce the value of the inhibit current. The circuit shown in FIG. 10 operates to reduce the inhibit current by the combined resistance of the limiting resistors 161 and 162 and the increased resistance of the inhibit lines 151 and 151' brought about by the ambient temperature.

The inhibit current can be represented by the equation:

$$I=V(R_{(161\ or\ 162)}+R_s)$$

where:

$V=+5$ volts $R_{(161\ or\ 162)}=3.92$ ohms $R_s=$ line resistance $=10$ ohms

The valves above are suitable for the intended purpose, the values being exemplary of those which could be utilized.

The present invention point of origin document processor provides a device which will be readily adapted to industries which require real-time processing of documents typically at the location where the document is prepared. The present invention provides a relatively low cost apparatus which will eliminate the need for more costly and complex equipment as well as provide an efficient alternative for tasks which have theretofore been accomplished by inefficient, manual techniques.

We claim:

1. A point of origin document processor in combination with a document having a plurality of laterally separated data channels, longitudinal segments of which are bounded by timing indicia spaced equidistant from each other, said data channels adapted to receive manually disposed mark sense data, said point of origin document processor comprising:

a. a stored program, general purpose digital computer having an internal storage unit and a data input unit and a data output unit adapted to process the intelligence contained in mark sense data disposed on the document;

b. first optical detection means for detecting and transferring to the digital computer the mark sense data disposed upon the plurality of data channels of the document, said optical detection means coupled to the data input unit of said digital computer;

c. second optical detection means for detecting the presence of the document and the timing indicia, coupled to the data input unit of the digital computer;

d. printing means for printing indicia at given locations on the document, said printing means coupled to the data output unit of said digital computer and in juxtiposition to said second optical detector means;

e. a sprocketless document transport apparatus comprising:

i. first and second groups of crowned rollers;

ii. a drive wheel having a peripheral surface adapted for frictional engagement thereto;

iii. male and female belt configurations each having an inside and outside surface, the inside surface of said male belt configuration cooperatively engaging said first group of crowned rollers and the peripheral surface of said drive wheel the inside surface of said female belt configuration cooperatively engaging said second group of crowned rollers, the outside surfaces of said male and female belt configurations being in frictional engagement for a distance substantially extending from said first optical detection means to said printing means;

iv. rotation means for rotating said drive wheel; and f. output means for outputting the data processed by said digital computer coupled to the data output unit of said digital computer.

2. A point of origin document processor as in claim 1 wherein the internal storage unit of said digital computer includes a magnetic core memory array having an improved inhibit/sense electrical circuit, the improvement comprising:

a. temperature compensating means in cooperative relation with the magnetic core memory array, said temperature compensating means for limiting the inhibit current applied to said magnetic core array;

b. transistor driving means having an input terminal and a pair of output terminals, said transistor driving means providing the inhibit current;

c. a pair of limiting resistors, each having a first and second terminal, the first terminal of each of said limiting resistors connected to one of the output terminals of said transistor driving means, the second terminal of each of said limiting resistors connected to said temperature compensating means; and d. magnetic flux sensing means for detecting the change of state of a portion of said magnetic core memory array, said magnetic flux sensing means connected to said temperature compensating means.

3. A point of origin document processor as in claim 1 wherein said output means includes a digital display and remote actuators.

4. A point of origin document processor as in claim 1 wherein said first optical detection means comprises:

a. a polarized filter in spaced relation with the document;

b. a light source;

c. optical reading means having first means for directing the light from said light source to each of the laterally separated data channels on the document and second means for detecting the light reflected from each of the plurality of laterally separated data channels of the document, said optical reading means being substantially adjacent said polarized filter;

d. photoelectric detection means for detecting the presence of light energy and outputting an electrical signal upon the presence thereof, said photoelectric detection means substantially adjacent said second means of said optical reading means whereby predetermined electrical signals are generated upon the reflection of light energy from the document;

e. amplifying means for adapting the output of said photoelectric detection means for input to the data input unit of said digital computer, said amplifying means connected to said photoelectric detection means; and f. light control feedback means for detecting the intensity of said light source and maintaining same at a substantially constant intensity, said light control feedback means connected to said light source.

5. A point of origin document processor as in claim 4 wherein said photoelectric detection means are phototransistors.

6. A point of origin document processor as in claim 4 wherein said fiber optic reading means comprises:

a. light source node fibers substantially adjacent said light source whereby the light energy of said light source is transferred thereto;

b. a plurality of fiber read nodes each comprising a first and second portion, said first portion being light source node fibers and said second portion being reflecting fibers whereby light energy from said light source is directed at the document, the reflected portion of the light energy being transferred by said reflecting fibers;

c. a plurality of signal nodes each comprising said reflecting fibers of one of said fiber read nodes; and d. intensity means for transferring the level of impinging light energy of said light source adapting same for detection.

7. A point of origin document processor as in claim 6 wherein said light control feedback means detects the intensity of said light source transferred by said intensity means.

8. A point of origin document processor as in claim 1 wherein said rotation means comprises:

a. a first motor for rotating said drive wheel in a forward direction;

b. a second motor for rotating said drive wheel in a reverse direction;

c. means for coupling said first and second motors to said drive wheel; and d. rotation control means for superimposing the rotation of said reverse motor over that of said forward motor whereby the forward motion of the document is rapidly halted.

9. A point of origin document processor in combination with a document having a plurality of laterally separated data channels, longitudinal segments of which are bounded by timing indicia spaced equidistant from each other along the document, the document being adapted to receive manually disposed mark sense data, said point of origin document processor comprising:

a. a general purpose, stored program digital computer having an internal storage unit and data input and data output unit adapted to process the intelligence contained in mark sense data disposed on the document;

b. a first optical reader comprising:

i. a light source;

ii. a polarized filter in parallel spaced relation with the document;

iii. an optical read head having a plurality of read nodes in spaced relation with each other, a light source node, a plurality of signals nodes and a light intensity node whereby the presence or absence of light reflected from each of the plurality of data channels on the document is adapted to be detected at one of the plurality of signal nodes, said light source node being substantially adjacent said light source;

iv. photoelectric detection means for outputting predetermined electrical signals upon detecting the presence or absence of light at said signal nodes;

v. amplifying means for adapting the output of said photoelectric detection means for input to said digital computer coupled to the data input unit of said digital computer; and vi. light control feedback means for monitoring the intensity of light from said light source at said light intensity node and maintaining said intensity at a predetermined level, said light control feedback means connected to said light source; and c. printing means coupled to said digital computer for printing indicia at given locations of the document; and d. a document transport apparatus comprising:

i. a first and second group of crowned rollers;

ii. a drive wheel having a peripheral surface adapted for frictional engagement thereto;

iii. male and female belt configurations each having an inside and outside surface, and inside surface of said male belt configuration cooperatively engaging said first group of crowned rollers and the peripheral surface of said drive wheel, the inside surface of said female belt configuration cooperatively engaging said second group of crowned rollers, the outside surfaces of said male and female belt configurations being in frictional engagement for a distance substantially extending from said optical reader to said printing means;

iv. first and second motors cooperatively coupled to said drive wheel, whereby said drive wheel is rotated in a forward or reverse direction at predetermined times; and v. rotation control means for superimposing the rotation of said reverse motor over that of said forward motor whereby the forward motion of the document is rapidly halted.

10. A point of origin document processor as in claim 9 wherein the internal storage unit of said digital computer includes a magnetic core memory array having an improved inhibit/sense electrical circuit, the improvement comprising:

a. temperature compensating means in cooperative relation with the magnetic core memory array, said temperature compensating means for limiting the inhibit current applied to said magnetic core memory array;

b. transistor driving means having an input terminal and a pair of output terminals, said transistor driving means for providing the inhibit current;

c. a pair of limiting resistors, each having a first and second terminal, the first terminal of each of said limiting resistors connected to one of the output terminals of said transistor driving means, the second terminal of each of said limiting resistors connected to said temperature compensating means; and d. magnetic flux sensing means for detecting the change of state of a portion of said magnetic core memory array, said magnetic flux sensing means connected to said temperature compensating means.

11. A point of origin document processor as in claim 9 wherein said light control feedback means comprises:

a. a photo-transistor substantially adjacent said light intensity node whereby the current conducted by said photo-transistor changes with relation to the light monitored at said light intensity node;

b. power means for outputting power to operate said light source; and c. means responsive to the current conducted by said photo-transistor for controlling the power output of said power means whereby the intensity of said light source is maintained substantially constant.

* * * * *